(12) United States Patent
Ingram, Jr.

(10) Patent No.: US 11,013,297 B2
(45) Date of Patent: May 25, 2021

(54) CONTROL CLIP DEVICE

(71) Applicant: Arthur Marvin Ingram, Jr., Raleigh, NC (US)

(72) Inventor: Arthur Marvin Ingram, Jr., Raleigh, NC (US)

(*) Notice: Subject to any disclaimer, the term of this patent is extended or adjusted under 35 U.S.C. 154(b) by 0 days.

(21) Appl. No.: 16/779,591

(22) Filed: Feb. 1, 2020

(65) Prior Publication Data

US 2020/0245729 A1 Aug. 6, 2020

Related U.S. Application Data

(60) Provisional application No. 62/800,749, filed on Feb. 4, 2019.

(51) Int. Cl.
*A44B 11/18* (2006.01)
*A01K 27/00* (2006.01)

(52) U.S. Cl.
CPC .............. *A44B 11/18* (2013.01); *A01K 27/00* (2013.01)

(58) Field of Classification Search
CPC ....... A01K 27/002; A01K 27/00; A44B 11/18
See application file for complete search history.

(56) References Cited

U.S. PATENT DOCUMENTS

| | | | |
|---|---|---|---|
| 519,543 A * | 5/1894 | McClure | A44B 11/18 24/193 |
| 4,299,014 A * | 11/1981 | Wood | A44B 11/18 24/196 |
| 5,791,295 A | 8/1998 | Schmid | |
| 6,161,505 A | 12/2000 | Noguero | |
| D443,117 S | 5/2001 | Rubin | |
| 6,223,694 B1 | 5/2001 | Rubin | |
| 6,307,659 B1 | 10/2001 | Gilliland | |
| 6,340,001 B1 | 1/2002 | Hendrie | |
| 6,626,131 B2 | 9/2003 | Moulton, III | |
| 7,107,940 B2 | 9/2006 | Abinanti | |
| 7,131,400 B2 | 11/2006 | Wanveer | |
| 7,165,511 B1 | 1/2007 | Brezinski | |
| 7,243,615 B1 | 7/2007 | Hendrie | |
| 7,891,322 B2 | 2/2011 | Bennett et al. | |
| D640,425 S | 6/2011 | Reed | |
| D640,840 S | 6/2011 | Reed | |
| 8,171,891 B2 | 5/2012 | Rubinstein et al. | |
| 8,360,009 B2 | 1/2013 | Rubinstein et al. | |
| D683,085 S | 5/2013 | Parker | |
| 8,459,212 B2 | 6/2013 | Meisenbach | |
| 9,271,476 B1 | 3/2016 | Flynn | |
| 9,301,505 B1 | 4/2016 | Luna | |
| D757,376 S | 5/2016 | Blizzard | |
| 9,439,399 B2 | 9/2016 | Rubinstein et al. | |
| 9,468,195 B2 | 10/2016 | Blizzard et al. | |
| 9,572,325 B2 | 2/2017 | Silva | |
| 9,615,544 B2 | 4/2017 | Bandler | |
| 9,877,465 B2 | 1/2018 | Blizzard et al. | |

(Continued)

*Primary Examiner* — Robert Sandy
(74) *Attorney, Agent, or Firm* — Austin Sanders; NCCU School of Law IP Clinic (57) ABSTRACT

An adjustable control clip cinches to secure webbing; is useful in constructing pet control devices in various configurations with one continuous length of webbing. The clip is also used in securing luggage straps or tie downs, in adjustable bag straps, or in any other device requiring the use of an adjustable strap or webbing secured or guided by a clip.

19 Claims, 10 Drawing Sheets

(56) References Cited

U.S. PATENT DOCUMENTS

| | | |
|---|---|---|
| 9,883,656 B1 | 2/2018 | Turner |
| 2011/0154955 A1* | 6/2011 | Fidrych ................ A01K 27/006 81/3.09 |

* cited by examiner

CONTROL CLIP DEVICE

CROSS-REFERENCE TO RELATED APPLICATIONS

This application claims the benefit of U.S. Provisional Application No. 62/800,749 filed on Feb. 4, 2019, which is hereby incorporated in its entirety.

FIELD OF THE INVENTION

This invention relates generally to a clip to secure webbing. Further, this invention pertains to an adjustable control clip device useful in securing webbing used in creating an animal device configurable into a leash, harness, and collar combination with one continuous length of webbing, or in securing luggage straps or tie downs, or in adjustable bag straps, or in any other device requiring the use of an adjustable strap or webbing secured or controlled by a clip.

BACKGROUND OF THE INVENTION

The following description is not an admission that any of the information provided herein is prior art or relevant to the present invention, or that any publication specifically or implicitly referenced is prior art. Any publications cited in this description are incorporated by reference herein. Where a definition or use of a term in an incorporated reference is inconsistent or contrary to the definition of that term provided herein, the definition of that term provided herein applies and the definition of that term in the reference does not apply.

There are multiple varieties of clips currently in use as fasteners. Fastener clips have been used to secure webbing in a wide variety of applications such as backpacks, bags, luggage, animal leashes, collars, and harnesses, human safety harnesses, sporting equipment, and other items.

Clip products currently available on the market are typically permanently attached to webbing material and usually lack the independent ability to adjust to ensure a proper or secure fit. These products require the use of multiple additional components to achieve adjustability, adding additional materials and labor cost, and creating multiple points of weakness.

Generally, because these devices are sewn or glued at a specific location on the webbing to create a secure connection, they lack the ability to move up and down the length of the webbing. There is also not an option to relocate the clip to another piece of webbing or to adapt the use of the clip for different configurations within the same product, or to use the clip with other products, showing a general lack of versatility among current clip devices. In particular, a pet owner using currently available clip products in harnesses, collars, or leashes may have to purchase several sizes or styles to be used over the life of the animal as it grows and training needs change.

Therefore, the need exists for a control clip device that is adjustable and can be used in multiple configurations and with existing products. In addition, a clip that does not require the addition of other components or does not introduce multiple points of weakness into the finished product would be a useful complement to the current market.

SUMMARY OF THE INVENTION

The present invention is directed to a control clip device that is configured to secure webbing in multiple configurations. The device comprises a tri-bar adjuster, one or more D-rings, and one or more hinging mechanisms and comprises polymer, plastic, wood, metal, or any similar rigid man-made or natural material. The device is generally used in conjunction with webbing material comprising various suitable material such as nylon, polypropylene, cotton, any combination thereof, or other similar flexible material. The adjustable control clip device is useful in securing webbing used in creating an animal device configurable into a leash, harness, and collar combination, or in securing luggage straps or tie downs, or in adjustable bag straps, or in any other device requiring the use of an adjustable strap or webbing secured or controlled by a clip.

The components of the control clip device are configured to adjust positioning of the device at points where control is needed for various configurations. The tri-bar adjuster portion is configured to move to different locations to accommodate different configurations. The hinges connect the tri-bar adjuster to the D-rings and additionally allow positioning of the D-rings as needed depending on the configuration. Multiple D-rings may be joined together to function as one ring or used separately to function as two rings to allow threading the webbing back through for cinching. They may also be moved to a flat position against the webbing to be out of the way if rings are not being utilized for the particular configuration. When used in conjunction with webbing material, the invention makes the webbing infinitely adjustable in size and allows positioning of the control points to allow cinching at any position along the length of the webbing material. This cinching allows the webbing to be fixed at a stationary point that holds steadfast despite the application of pressure from the remainder of the webbing. If another configuration or control point is desired, the control clip device can be uncinched, removed, and relocated, as well as used in conjunction with multiple control clip devices.

In one exemplary embodiment, the device is used in conjunction with webbing material to create either a collar, or a collar and leash combination for the control of an animal, which may include a dog, cat, pig, reptile, rabbit, or other four-legged animal. This embodiment is created by threading a length of webbing material through the tri-bar adjuster portion of the control clip and then looping it back through and securing it with the double D-rings. This creates a collar with an adjustable circumference with an extending webbing portion serving as a leash. Once the control clip is positioned, the circumference of the collar is fixed, even when exposed to pressure from the pull of the leash portion. The control clip may be repositioned to adjust the size of the collar, or to expand the size of the collar for removal in various uses. A portion of webbing may be extended to allow a leash configuration, which may be secured with a tri-bar adjuster or an additional control clip device.

In another exemplary embodiment, the device is used in conjunction with webbing material to create a slip lead for the control of an animal in addition to the leash and collar configuration. The webbing material is threaded through the tri-bar adjuster portion of the control clip without being cinched through the D-rings to create a loop that is placed around the circumference of an animal's neck, along with an extended leash portion. This creates a slip lead that can be adjusted quickly and tightens in response to pressure on the leash portion. This configuration allows for easy removal of the slip lead leaving the collar in place.

In yet another exemplary embodiment, two control clips are used in conjunction with webbing material to create a collar, leash, and harness combination for the control of an animal. The webbing is threaded through the tri-bar adjuster portion of the control clip and then looped back through and secured with the double D-rings, creating a collar with an adjustable circumference with an extending webbing portion which is threaded through an additional control clip to allow the creation of multiple harness configurations. The second control clip can be positioned on the animal's back, chest, or neck to allow the extended webbing portion to wrap around the torso or chest of the animal to form a harness. The webbing may be threaded through both D-rings simultaneously to allow flexibility and looseness in the restraint and control of the animal or cinched through both D-rings separately when constant pressure control is desired. Conversely, webbing may be threaded simultaneously through both D-rings, without cinching, directing control pressure to the torso, rather than the neck of the animal, for increased control in response to the animal pulling.

In still another exemplary embodiment, two control clips are used in conjunction with webbing material to create a harness combination for the control of an animal, with an optional leash attached. The webbing is threaded through the tri-bar adjuster portion of the control clip and then looped back through and secured with the double D-rings, creating a loop with an adjustable circumference with an extending webbing portion which is threaded through an additional control clip to allow the creation of a second loop around the animal's body, with an extending webbing portion. The second control clip can be positioned on the animal's back, chest, or neck to allow the extended webbing portion to wrap around the torso or chest of the animal to form a harness. The webbing may be threaded through the both rings simultaneously to allow flexibility and looseness in the restraint and control of the animal, or the webbing may be cinched through both D-rings separately when more control is desired.

In a further exemplary embodiment, the control clip may be used to secure luggage. Webbing material is looped around the luggage, or optionally through the luggage handle, and threaded through the tri-bar adjuster portion of the control clip and then looped back through and secured with the double D-rings, creating a secure loop.

In another embodiment, the device is an adjustable control clip device comprising a tri-bar adjuster having a right and left end, a middle bar portion, a top surface and a bottom surface; at least one D-ring having a flat portion and a curved portion; and at least one hinging mechanism; wherein the flat portion of the D-ring is parallel and flush to the top surface of the middle bar portion of the tri-bar adjuster and is fastened to the middle bar portion of the tri-bar adjuster by the hinging mechanism. In this embodiment, the curved portion of the D-ring is free and configured to move back and forth from the hinging mechanism.

In another embodiment, the device comprises durable polymer, plastic, wood, metal, or any combination thereof, or other strong material configured to withstand resistance from materials threaded through the device and from pressure exerted thereon.

In another exemplary embodiment, the webbing material comprising various material such as nylon, polypropylene, cotton, any combination thereof, or other suitable flexible material, is threaded through device and the device is removable and adjustable along the webbing material.

In a further embodiment, webbing material comprising various material such as nylon, polypropylene, cotton, any combination thereof, or other suitable flexible material, is threaded through the device, and the device is capable of being cinched tightly to secure the webbing material in place.

In another embodiment, the tri-bar adjuster comprises exterior dimensions of a width ranging from about 0.75 inches to 1.3 inches, and height ranging from about 0.8 inches to 0.9 inches. In another embodiment, the tri-bar adjuster comprises interior dimensions of a width comprising from about 0.5 inches to 2 inches and interior height comprising from about 0.2 inches to 0.5 inches.

In another embodiment, the at least D-ring comprises an exterior width of about 0.6 inches to 2.5 inches and height of about 0.4 inches to 1.4 inches and comprises an interior width of about 0.5 inches to 2 inches and height of about 0.2 inches to 0.9 inches. In a further embodiment, the at least one D-ring comprises two D-rings, wherein said two b-rings are joined to function as one ring or used separately to allow threading webbing or other material back through said two D-rings for cinching.

The device of claim 1, wherein said at least one D-ring comprises three D-rings, wherein said three D-rings are joined to function as one ring or used separately to allow threading webbing or other material back through said three D-rings for cinching.

In another embodiment, the D-ring is flat to be flush against the webbing, or upright at angles ranging from about 0 to 180 degrees.

In another exemplary embodiment, material such as nylon, polypropylene, cotton, or any combination thereof, or other suitable flexible material is threaded through, between, or over the D-ring.

In another embodiment, the hinging mechanism is formed by securing the D-ring to the middle bar portion with a tie, loop, or clamp.

In a further embodiment, the tie, loop, or clamp of the hinging mechanism completes a 360-degree loop and allows 180 degrees of rotation of the D-ring. In another embodiment, the tie, loop, or clamp or similar device of the hinging mechanism comprises plastic, polymer, wood, metal, or other suitable material and has a tensile strength of from 18 pounds to 100 pounds.

In another embodiment, the hinging mechanism comprises a diameter ranging from about 0.4 inches to 0.6 inches.

In another embodiment, the webbing material comprising nylon, polypropylene, cotton, any combination thereof, or other suitable flexible material, is threaded through the device to enter the opening from the bottom surface of the left end of the tri-bar adjuster up to the top surface of the tri-bar adjuster and weaves over the hinging mechanism and the middle bar portion of the tri-bar adjuster down and through the opening on the right end of the tri-bar adjuster and then back to the left end of the tri-bar adjuster onto the top of the tri-bar adjuster through one or more D-rings.

In another embodiment, the webbing material comprising nylon, polypropylene, cotton, any combination thereof, or other suitable flexible material, is threaded through the device to enter the opening from the bottom surface of the right end of the tri-bar adjuster up to the top surface of the tri-bar adjuster and weaves over the hinging mechanism and the middle bar portion of the tri-bar adjuster down and through the opening on the left end of the tri-bar adjuster and then back to the right end of the tri-bar adjuster onto the top of the tri-bar adjuster through one or more D-rings.

In another embodiment, the webbing material comprising nylon, polypropylene, cotton, any combination thereof, or other suitable flexible material, is threaded through the device to enter the opening from the top surface of the left end of the tri-bar adjuster down to the bottom surface of the tri-bar adjuster and weaves over the hinging mechanism and the middle bar portion of the tri-bar adjuster up and through the opening on the right end of the tri-bar adjuster and then back to the left end of the tri-bar adjuster onto the bottom of the tri-bar adjuster through one or more D-rings.

In another embodiment, the webbing material comprising nylon, polypropylene, cotton, any combination thereof, or other suitable flexible material, is threaded through the device to enter the opening from the top surface of the right end of the tri-bar adjuster down to the bottom surface of the tri-bar adjuster and weaves over the hinging mechanism and the middle bar portion of the tri-bar adjuster up and through the opening on the left end of the tri-bar adjuster and then back to the right end of the tri-bar adjuster onto the bottom of the tri-bar adjuster through one or more D-rings.

In a further exemplary embodiment, the device is an adjustable control clip system comprising a tri-bar adjuster having a right and left end, a middle bar portion, a top surface and a bottom surface; at least one D-ring having a flat portion and a curved portion; and at least one hinging mechanism; wherein the flat portion of the D-ring is parallel and flush to the top surface of the middle bar portion of the tri-bar adjuster, and is fastened to the middle bar portion of the tri-bar adjuster by the hinging mechanism.

Various objects, features, aspects and advantages of the inventive subject matter will become more apparent from the following detailed description of exemplary embodiments, along with the accompanying figures in which like numerals represent like components.

DETAILED DESCRIPTION

The present invention is a control clip device that is adjustable and cinches to secure webbing configured to secure control to various webbings. The control clip device is useful in constructing pet control devices in various configurations, in securing luggage straps or tie downs, in adjustable bag straps, or in any other device requiring the use of an adjustable strap or webbing secured by a clip.

As used herein, and unless the context dictates otherwise, the term "webbing" is intended to include straps, woven fabrics, or other fabrics of a strong and durable nature. Therefore, the terms "webbing," "straps," and "woven fabric" are used synonymously. Furthermore, the terms "hinge" and "hinging mechanism" are used synonymously. Furthermore, webbing and webbing material are used interchangeably. In addition, the terms "thread," "threading," "weave," or "weaving" are used synonymously and are intended to refer to the action of directing a flexible material along a certain path. As used herein, the terms "animal" and "pet" are used synonymously and are intended to refer to any four-legged animal including a dog, cat, pig, reptile, rabbit, or any other animal. As used herein, "control clip device" and "adjustable control clip device" are used synonymously.

As used in the description herein and throughout the claims that follow, the meaning of "a," "an,", "and", and "the" includes plural reference unless the context clearly dictates otherwise. Also, as used in the description herein, the meaning of "in" includes "into" and "on" unless the context clearly dictates otherwise. As used herein, the term "about" in conjunction with a numeral refers to a range of that numeral starting from 10% below the absolute of the numeral to 10% above the absolute of the numeral, inclusive.

Exemplary configurations of the embodiment for the present invention are depicted in FIGS. 1-10 in which control clip device 100 is designed to cinch, control, and secure webbing material. In one embodiment, control clip device 100 is configured to be used with webbing 40 or other similar material. In an embodiment, control clip device 100 comprises a tri-bar adjuster 10, with a right end 11, a left end 13, a top surface 14, a bottom surface 15, and a middle bar portion 12, at least one b-rings 20, with a curved portion 21 and a flat portion 22, and one or more hinging mechanisms 30. Optionally, D-rings 20 comprises 1, 2, 3, 4, 5, 6, 7, 8, 9, or 10 rings. Hinging mechanism 30 is formed by securing the flat portion 22 of D-rings 20 to middle bar portion 12 of tri-bar adjuster 10 with a tie, loop, or clamp or similar device comprising a plastic, polymer, wood, metal, or other suitable material, completing a 360-degree loop and allowing 180-degree rotation of the flat portion 22 of D-rings 20. In an embodiment control clip device 100 comprises durable polymer, plastic, wood, metal, or any combination thereof, or other similar material configured to withstand resistance from webbing 40 and the items being controlled (see FIG. 1). Device 100 may be manufactured in various ways including through molding, injection, tooling, sculpture, or any other suitable method, as determined by one of ordinary skill in the art. Tri-bar adjuster 10, D-rings 20 and hinging mechanism 30 of control clip device 100 can be manufactured from the same material or other suitable material that a person of skill in the art will be readily able to select that is within the scope of the present invention conducive to device 100.

Figure 1:
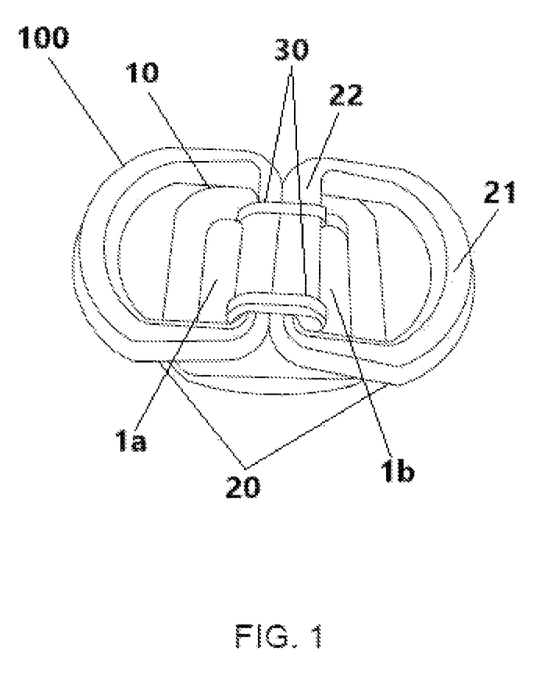
FIG. 1 depicts a top view of an exemplary configuration of a control clip device according to the present invention, with D-rings in one of various adjustable positions.
Figure 2:
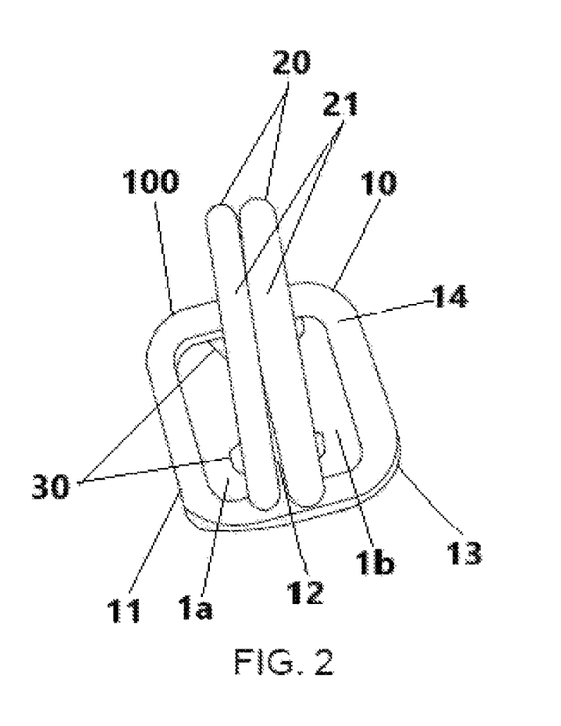
FIG. 2 depicts a front view of an exemplary configuration of a control clip device according to a present invention, depicting D-rings raised.
Figure 3:
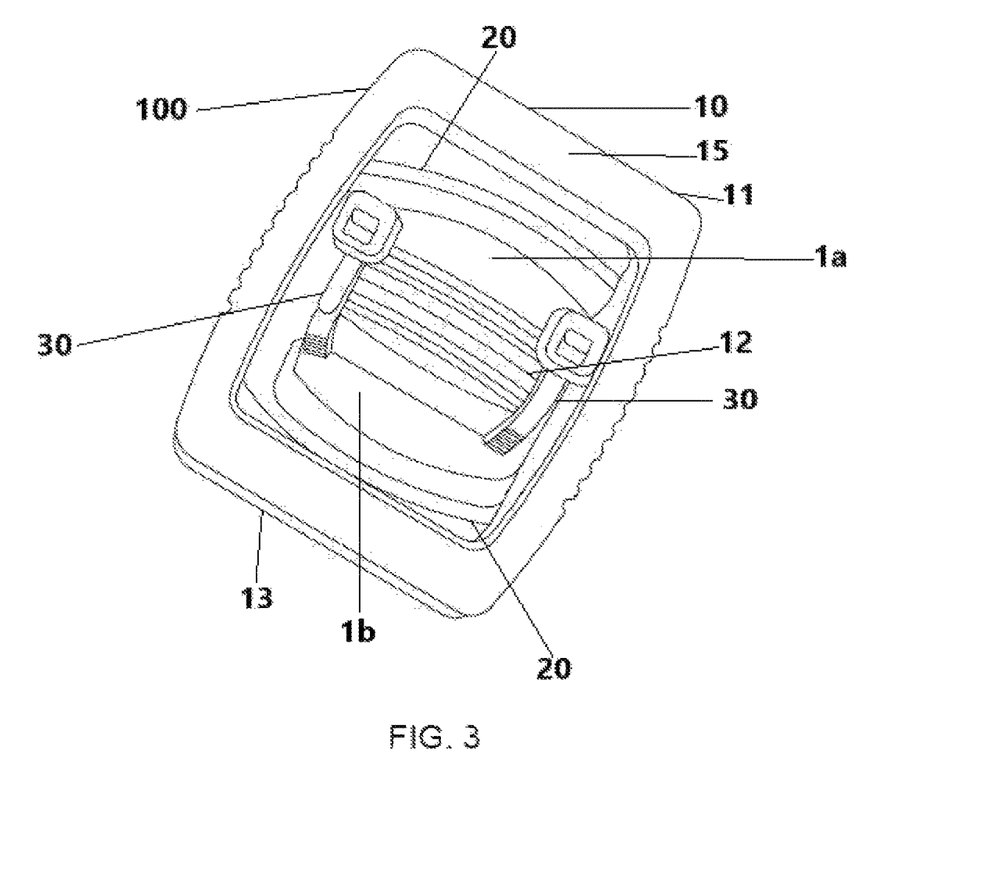
FIG. 3 depicts an exemplary configuration of the control clip device, according to a present invention, of a bottom view of the D-rings at rest.

In one embodiment, tri-bar adjuster 10 comprises exterior dimensions of a width ranging from about 0.75 inches to 1.3 inches, and height ranging from about 0.8 inches to 0.9 inches, with interior width comprising from about 0.5 inches to 2 inches and interior height comprising from about 0.2 inches to 0.5 inches. In one embodiment, D-ring(s) 20 comprise(s) an exterior width of about 0.6 inches to 2.5 inches, and height of about 0.4 inches to 1.4 inches; interior dimensions of width about 0.5 inches to 2 inches; height of about 0.2 inches to 0.9 inches. Hinging mechanism(s) 30 comprise(s) a diameter ranging from about 0.4 inches to 0.6 inches with a thickness to provide a tensile strength of from 18 pounds to 100 pounds. A skilled person in the art will be readily able to select an alternative suitable sizing for control clip device 100 based upon operating conditions and requirements in the configurations contemplated herein. In an embodiment, as depicted in FIGS. 1-3, D-ring 20 is attached to tri-bar adjuster 10 using hinging mechanism 30 with or without adhesive and other such methods common in the state of the art. In one embodiment, flat portion 22 of D-ring 20 is placed against tri-bar adjuster 10 and secured by hinging mechanism 30 which wraps around each flat portion 22 of D-ring 20 and middle bar portion 12 of tri-bar adjuster 10, leaving opening 1a and 1b in tri-bar adjuster 10, to either side of middle bar portion 12. Curved portion 21 of D-ring 20 is free and configured to move back and forth from hinging mechanism 30. One of ordinary skill in the art can envision other means of attachment for D-ring(s) 20 and device 100.

In one exemplary embodiment, control clip device 100 is configured to secure webbing material 40. In an embodiment, webbing 40 can be threaded through device 100 in different configurations (see FIGS. 4-10). In one embodiment, webbing 40 can be threaded to enter the opening 1a from the bottom surface 15 of tri-bar adjuster 10 at left end 13, pass through top surface 14 of tri-bar adjuster 10 and weave over hinge mechanism 30 and middle bar portion 12 of tri-bar adjuster 10 down and through the opening 1b on right end 11 of tri-bar adjuster 10, then back to left end 13 on top surface 14 of tri-bar adjuster 10 through the opening of one or more D-rings 20. Conversely, in other configurations, tri-bar adjuster 10 can be threaded with webbing 40 from bottom surface 15 of left end 13, top surface 14 of right end 11, or top surface 14 of left end 13 of tri-bar adjuster 10. Webbing 40 may also be threaded through, between, or over D-ring(s) 20 depending on the amount of control desired. In addition, in one embodiment, D-ring(s) 20 when not in active use to secure webbing 40, may be positioned at rest parallel and laying flat to one side against webbing 40 to prevent interference with the movement of webbing 40. A person of ordinary skill in the art would be able to envision multiple configurations of webbing 40 threaded through the various components of device 100.

Figure 4:
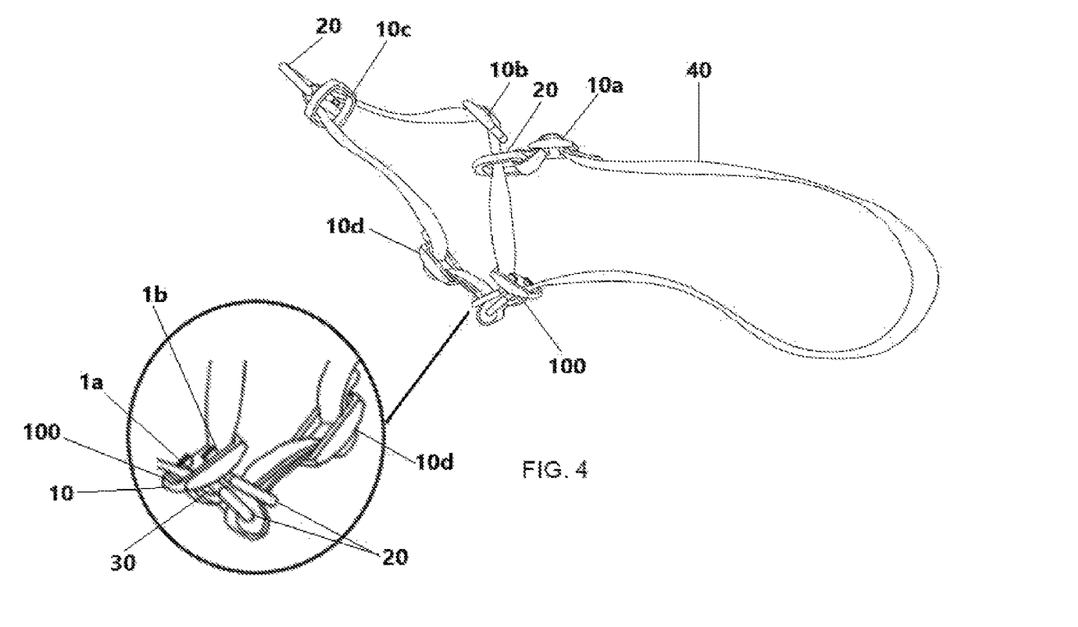
FIG. 4 depicts a top view of an exemplary configuration of the control clip device, according to a present invention, depicting an adjustable collar utilized for a pet.

An exemplary configuration is depicted in FIG. 4, in which control clip 100 is used in conjunction with tri-bar adjusters 10 and D-rings 20 to form an adjustable collar for the control of a pet. In this embodiment, a continuous predetermined length of webbing 40 forms two loops in a FIG. 8 configuration. The end of webbing 40 is threaded through tri-bar adjuster 10a, looped around D-ring 20, and threaded back through tri-bar adjuster 10a. Next, webbing 40 enters control clip device 100, exiting to thread freely through D-ring 20, and threads through a second tri-bar adjuster 10b, which upon use on a pet, is used to limit the mobility of webbing 40 after adjustment of webbing 40 through D-ring 20. Webbing 40 then threads through a third tri-bar adjuster 10c and D-ring 20 simultaneously. Next, webbing 40 continues through a fourth tri-bar adjuster 10d, then through D-rings 20 of control clip 100, and finally back through the fourth tri-bar adjuster 10d to be secured. The circumference of each separate loop of the collar may be adjusted with positioning of control clip 100 to accommodate pets of various head and neck sizes. In one embodiment, D-ring 20 secured with webbing 40 proximal to the third tri-bar adjuster 10c provides a location for attachment of a separate leash if desired and the adjustable feature of control clip 100 provides the ability to tighten a collar when pulled by the leash or other device attached to D-ring 20.

Figure 5:
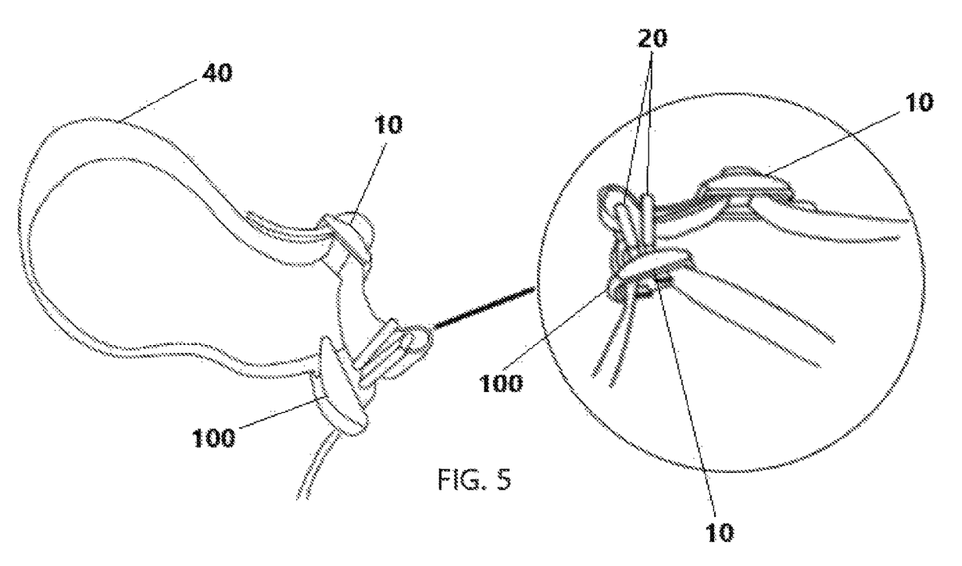
FIG. 5 depicts a front view of an exemplary configuration of the control clip device, according to a present invention, depicting a second collar configuration on a pet.

Another exemplary configuration is depicted in FIG. 5, in which control clip device 100 and tri-bar adjuster 10 are used together along with a length of webbing 40 to form a collar for control of an animal.

Figure 6:
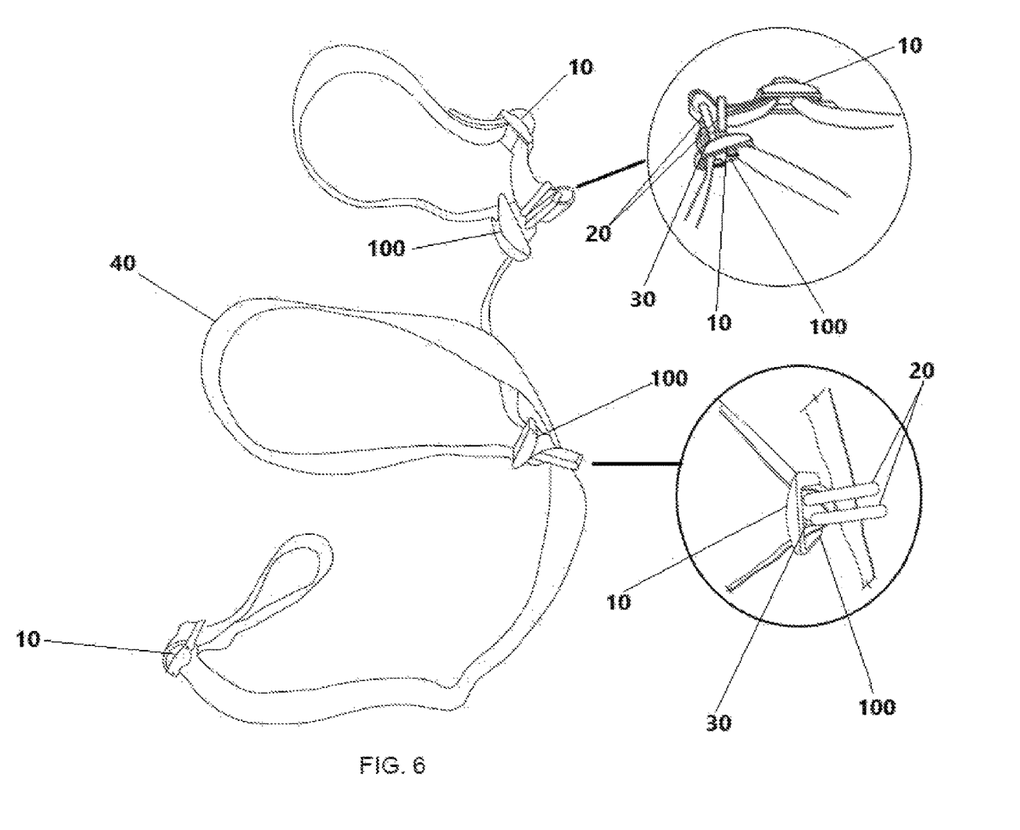
FIG. 6 depicts an exemplary configuration of the control clip device according to a present invention, depicting a top view of a configuration for a pet control embodiment pertaining to a leash, collar, and harness, with an adjustable handle which may be formed either with control clip device 100 or together with a sewn handle.
Figure 7:
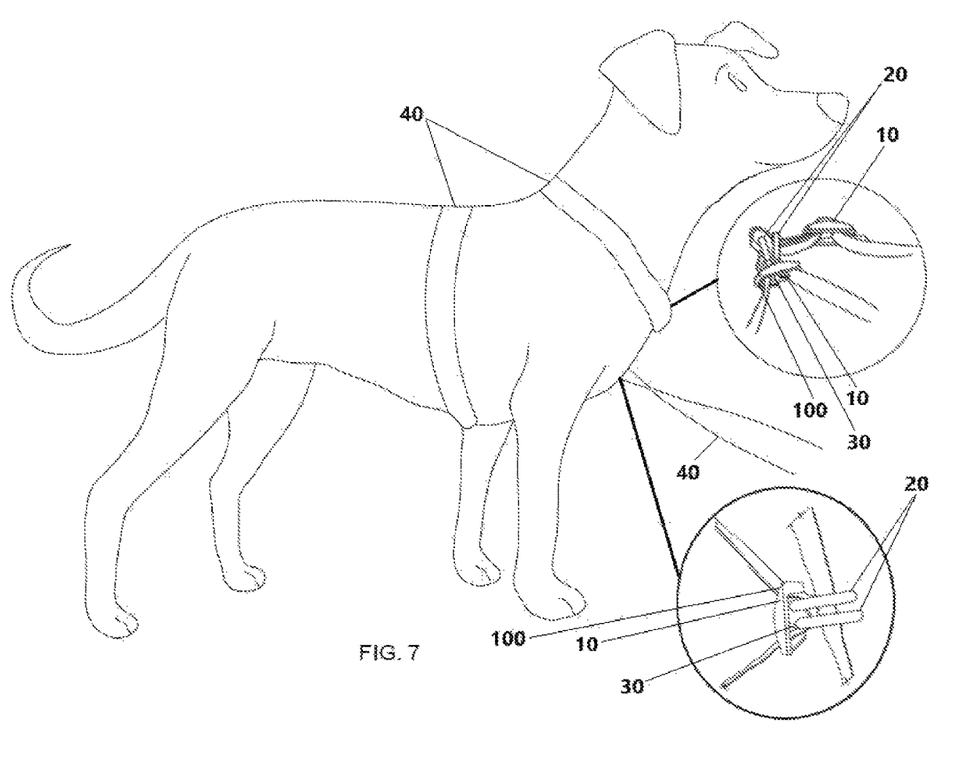
FIG. 7 depicts a frontal view of an exemplary configuration of the control clip, according to a present invention, of an animal control embodiment pertaining to a leash, collar, and harness with a chest control point on an animal.
Figure 8:
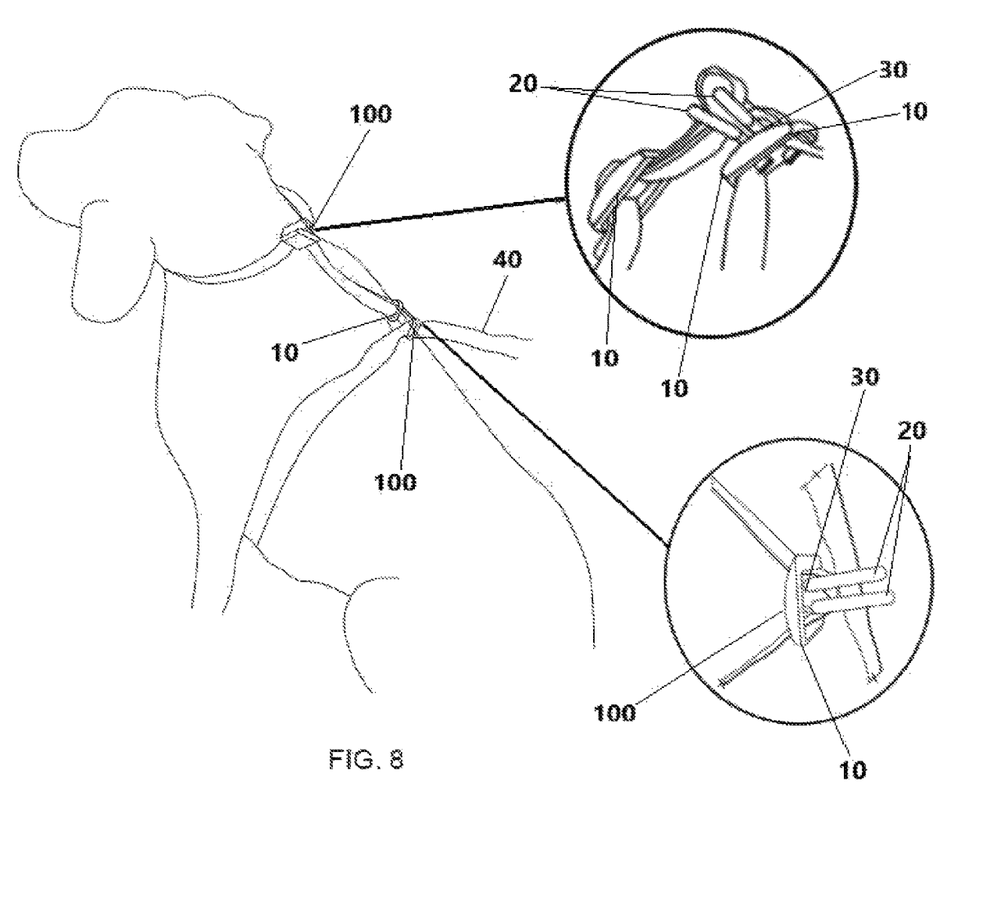
FIG. 8 depicts a front view of an exemplary configuration of the control clip device, according to a present invention, depicting a pet control embodiment pertaining to a leash, collar, and harness with a control point on the back of a pet.

FIGS. 6-8 depict other exemplary embodiments, wherein two control clip devices 100, two tri-bar adjusters 10, and webbing 40 are utilized to form a pet control configuration comprising a harness, leash, and collar combination. These embodiments are configured such that the control point is located at various points including, but not limited to, the chest, back, or neck of the pet. FIG. 7 depicts a chest control point and FIG. 8 depicts a control point at the pet's back. A person of ordinary skill in the art would also be able to envision other configurations and control points in these embodiments.

Figure 9:
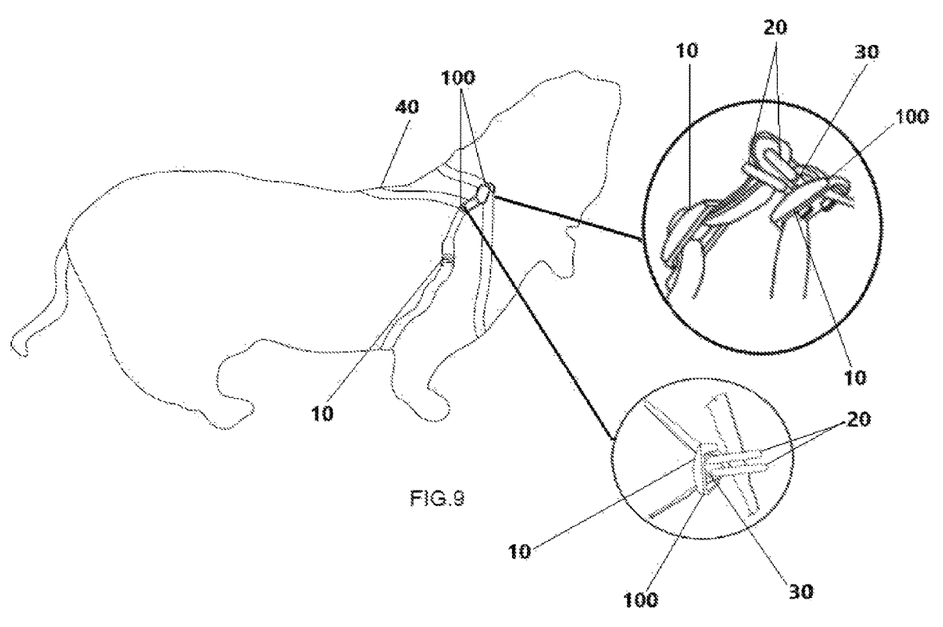
FIG. 9 depicts a frontal view of an exemplary configuration of the control clip device, according to a present invention, depicting a pet control embodiment pertaining to a harness, without a leash configuration.
Figure 10:
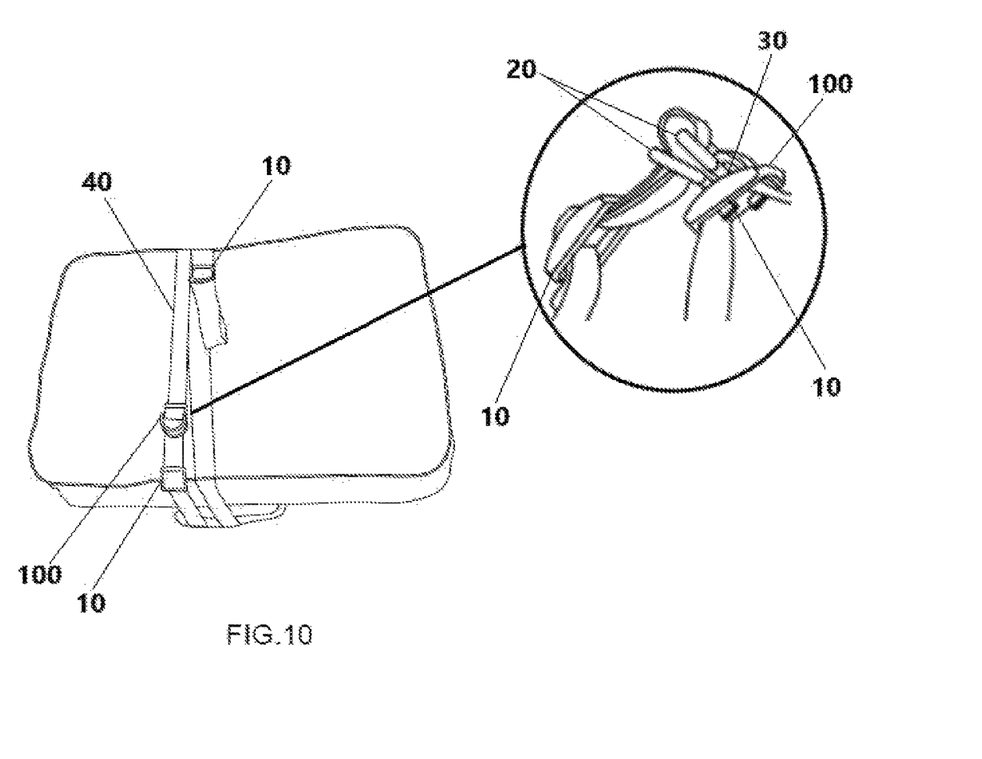
FIG. 10 depicts a front view of an exemplary configuration of the control clip device, according to a present invention, depicting a luggage strap embodiment.

FIG. 9 depicts yet another pet control embodiment, forming a harness animal control configuration where webbing 40 is placed through two control clip devices 100 and one or more tri-bar adjuster(s) 10. In another exemplary embodiment, at least one control clip device 100 and webbing 40 form a strap to secure luggage, bags, or other items (see FIG. 10). In this embodiment, webbing 40 is wrapped around the body of the item desired to be secured and threaded through device 100 and pulled securely to prevent slippage of webbing 40. One of ordinary skill in the art could picture the use of one or more control clip devices 100 to secure webbing in this configuration and the use of tri-bar adjuster(s) 10 to secure loose ends of the webbing 40, or many other configurations. Control clip device 100 may be utilized for many various applications, whenever a secure or adjustable clip is needed to secure webbing.

Thus, specific embodiments of a control clip device 100 to aid in securing and controlling webbing material and methods to use and manufacture such device have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. An adjustable control clip device comprising:
    (a) a tri-bar adjuster having a right and left end, a middle bar portion, a top surface and a bottom surface;

(b) at least one D-ring having a flat portion and a curved portion; and (c) at least one hinging mechanism;

wherein said flat portion of said at least one D-ring is parallel and flush to said top surface of said tri-bar adjuster and is fastened to said middle bar portion of said tri-bar adjuster by said hinging mechanism.

2. The device of claim 1, wherein said device comprises polymer, plastic, wood, metal, or any combination thereof, or other material configured to withstand resistance from materials threaded through said device and from pressure exerted thereon.

3. The device of claim 1, wherein webbing material comprising nylon, polypropylene, cotton, any combination thereof, or other flexible material, is threaded through said device, and said device is removable and adjustable along said webbing material.

4. The device of claim 3, wherein said at least one D-ring is flat to be flush against said webbing material, or an upright position at angles ranging from about 0 to 180 degrees from said webbing material.

5. The device of claim 1, wherein when webbing material comprising nylon, polypropylene, cotton, any combination thereof, or other flexible material, is threaded through said device, said device is configured to be cinched tightly to secure said webbing material in place.

6. The device of claim 1, wherein said tri-bar adjuster comprises exterior dimensions of a width ranging from about 0.75 inches to 1.3 inches, and height ranging from about 0.8 inches to 0.9 inches.

7. The device of claim 1, wherein said tri-bar adjuster comprises interior dimensions of a width comprising from about 0.5 inches to 2 inches and an interior height comprising from about 0.2 inches to 0.5 inches.

8. The device of claim 1, wherein said at least one D-ring comprises an exterior width of about 0.6 inches to 2.5 inches and height of about 0.4 inches to 1.4 inches and an interior width of about 0.5 inches to 2 inches and height of about 0.2 inches to 0.9 inches.

9. The device of claim 1, wherein said at least one D-ring comprises two D-rings, wherein said two D-rings are joined to function as one ring or used separately to allow threading webbing or other material back through said two D-rings for cinching.

10. The D-ring of claim 9, wherein material such as nylon, polypropylene, cotton, or any combination thereof, or other flexible material is threaded through, between, or over said two D-rings.

11. The device of claim 1, wherein said at least one D-ring comprises three D-rings, wherein said three D-rings are joined to function as one ring or used separately to allow threading webbing or other material back through said three D-rings for cinching.

12. The device of claim 1, wherein said hinging mechanism is formed by securing said at least one D-ring to said middle bar portion with a tie, loop, or clamp.

13. The hinging mechanism of claim 12, wherein said tie, loop, or clamp, complete a 360-degree loop and allow 180 degrees of rotation of said D-ring.

14. The hinging mechanism of claim 12, where said tie, loop, or clamp comprises plastic, polymer, wood, metal, or other material and has a tensile strength of from 18 pounds to 100 pounds.

15. The hinging mechanism of claim 1, wherein said hinging mechanism comprises a diameter ranging from about 0.4 inches to 0.6 inches.

16. The device of claim 1, wherein webbing material comprising nylon, polypropylene, cotton, any combination thereof, or other flexible material, is threaded through said device to enter an opening from said bottom surface of said tri-bar adjuster up to said top surface of said tri-bar adjuster and weave over said hinging mechanism and said middle bar portion of said tri-bar adjuster down and through an opening on said right end of tri-bar adjuster and then back to said left end of said tri-bar adjuster onto said top surface of said tri-bar adjuster through said at least one D-ring.

17. The device of claim 1, wherein webbing material comprising nylon, polypropylene, cotton, any combination thereof, or other suitable flexible material, is threaded through said device to enter an opening from said bottom surface of said tri-bar adjuster up to said top surface of said tri-bar adjuster and weave over said hinging mechanism and said middle bar portion of said tri-bar adjuster down and through an opening on said left end of tri-bar adjuster and then back to said right end of said tri-bar adjuster onto said top surface of said tri-bar adjuster through said at least one D-ring.

18. The device of claim 1, wherein webbing material comprising nylon, polypropylene, cotton, any combination thereof, or other flexible material, is threaded through said device to enter an opening from said top surface of said tri-bar adjuster down to said bottom surface of said tri-bar adjuster and weave over said hinging mechanism and said middle bar portion of said tri-bar adjuster up and through an opening on said right end of tri-bar adjuster and then back to said left end of said tri-bar adjuster onto said bottom of tri-bar adjuster through said at least one D-ring.

19. The device of claim 1, wherein webbing material comprising nylon, polypropylene, cotton, any combination thereof, or other suitable flexible material, is threaded through said device to enter an opening from said top surface of said tri-bar adjuster down to said bottom surface of said tri-bar adjuster and weave over said hinging mechanism and said middle bar portion of said tri-bar adjuster up and through an opening on said left end of tri-bar adjuster and then back to said right end of said tri-bar adjuster onto said bottom of tri-bar adjuster through said at least one D-ring.

* * * * *